Jan. 10, 1933.　　　　S. SCHIFF　　　　1,893,845
COMBINATION DIVIDER AND BALLER
Filed Oct. 15, 1931　　　4 Sheets-Sheet 1

Fig. 1.

Inventor
Sigmund Schiff
By Murray Zugelter
Attorneys

Jan. 10, 1933.  S. SCHIFF  1,893,845
COMBINATION DIVIDER AND BALLER
Filed Oct. 15, 1931   4 Sheets-Sheet 2

Inventor
Sigmund Schiff
By Murray M Zugelter
Attorneys

Jan. 10, 1933.  S. SCHIFF  1,893,845
COMBINATION DIVIDER AND BALLER
Filed Oct. 15, 1931  4 Sheets-Sheet 3

Inventor
Sigmund Schiff
By Murray & Zugelter
Attorneys

Inventor
Sigmund Schiff
By Murray M Zugelter
Attorney

Patented Jan. 10, 1933

1,893,845

UNITED STATES PATENT OFFICE

SIGMUND SCHIFF, OF CINCINNATI, OHIO

COMBINATION DIVIDER AND BALLER

Application filed October 15, 1931, Serial No. 568,921, and in Great Britain December 13, 1930.

This invention relates to a combination divider and baller or "rounder", such as may be used in the measuring or dividing, and balling of plastics such as dough and the like.

An object of the invention is to provide a device that will avoid certain objectionable features of dividers heretofore made, and that will accomplish results and advantages unattained by devices heretofore produced.

Another object is to provide a simple and efficient device for the purposes stated.

A further object of the invention is to provide a divided mechanism that will accurately measure or divide the plastic so as to accomplish evenness of weight of the various lumps of plastic divided from a mass upon which the device is adapted to operate.

Another object is to provide a device that will not produce deleterious effects upon plastics such as dough, and which will not in any way interfere with the expeditious, natural and normal proofing of dough.

Another object of the invention is to remove gas from the dough before measuring the dough, whereby to attain equal weight of succeeding lumps of dough with a minimum of compression.

A further object of the invention is to provide, in combination with a dough divided, a baller or rounder which receives the measred dough and forms it into loaves, the divider and baller having cooperative elements which are common to both mechanisms.

Another object is to provide a novel means for filling a plunger casing or measuring receptacle with dough, while at the same time exhausting the receptacle, and also the dough, of comparatively large gas or air pockets.

Another object is the provision of a novel hopper mounting for devices of the character described.

These and other objects are attained by the means described herein and disclosed in the accompanying drawings, in which.

Briefly stated, the invention comprises a rotating kneading wheel 16, which supports a rotating hopper 7 from which a plastic mass may be drawn or introduced into a plunger casing or measuring receptacle chamber 8, and from which chamber the mass is subsequently ejected by means of a plunger 9, after movement of the hopper to a non-registering position. The plastic mass first is induced or sucked into the cylinder 8 by the recession of the reciprocating plunger 9, and thereafter a sudden accelerated movement of the rotating hopper in the direction of rotation indicated, is effected to dispose the hopper in only a partial registering position, whereby to reduce the passage of communication between said receptacle and the hopper.

At the beginning of the upward movement of the plunger toward and upon the mass contained within the plunger chamber 8, the gases contained within the chamber 8 are drawn off or otherwise excluded, and the plastic mass is operated upon to some extent so as to push some of the mass back into the hopper 7, through the aforesaid reduced passage, whereby to cause complete filling of the chamber 8 with the plastic, and to effect a uniform consistency and density of the plastic masses before discharge from the measuring chamber 8. After the foregoing has occurred, and before discharge of the measured mass, a further relative movement of the hopper and plunger chamber places said chamber completely out of communication with the hopper, whereupon a further upward or extended movement of the plunger causes the measured mass to be discharged from the receptacle 8, to a position whence it may be removed from the top of the plunger and directed into the baller mechanism 10 at the receiving port 12 thereof, by the sweeping movement of an arm 61.

A vacuum was created in the receptacle at the time the plunger was moved downwardly, a pump 760 being provided for the purpose. The receptacle or plunger casing normally has its one end so exposed to dough in the hopper that dough in the hopper contacting the exposed portion of the receptacle, produces an air seal so that dough may be sucked into the chamber 8. The creation of the vacuum causes the larger pockets of gases in the dough to leave the dough and enter a vacuum chamber associated with the pump. These gases are withdrawn before the dough is ejected by the plunger 9, as will be explained in detail.

Heretofore there has been no provision made for the elimination of the gases in the manner just described, and in devices where a plunger was utilized to create an opening or receptacle into which the plastic mass was pushed or drawn, the gases excreted by the plastic, resulting from the action of the plunger, precluded complete filling of the receptacle with the plastic material. It was therefore possible to secure uniform weight of succeeding lumps of plastic, only by the use of high pressures detrimental to the dough. These disadvantages have been obviated by the means of the present invention.

The hopper 7 may be fed by a stationary main hopper or dough supply means 13, and intermediate these elements may be interposed a normally stationary cylindrical guide 14 which is aligned axially with the axis of rotation 15 of the rotary kneading wheel 16. The guide 14 is mounted upon an arm 17 supported for swinging movement in bearings 18, which, if desired, may be located on the stationary frame 19 of the machine. A removable pin 20 or other type of securing means, holds the guide in the normally operative position shown. From the foregoing it will be readily apparent that a continuous feed of plastic substance to the rotating hopper 7 is possible because part thereof is concentric with the guide 14 and in constant communication therewith. The stationary rotating kneading ring 10 surrounds the kneading wheel and cooperates therewith to form into balls or spheres the lumps of dough discharged by the divider mechanism. A series of suitable adjustable kneading plates are indicated at 21.

The kneading wheel and the hopper are rotated by the action of intermeshing gears 22 and 23. gear 23 being driven by power supplied through a sprocket or equivalent means 24, and gear 22 being secured, as at 25, to a rotatable sleeve 26 mounted upon suitable anti-friction bearings 27—28 supported upon a central stationary post 29. The kneading wheel is secured, as at 30, to the top of the rotating sleeve 26. Rotation of sprocket 24 therefore causes rotation of the kneading wheel 16. The disc-like shield 31 rotates with the sleeve 26 and may be secured thereto as at 32, the outer peripheral portion 33 thereof being slidable on an annular flange 34 extending interiorly of the frame of the machine. This shield is provided for the purpose of keeping foreign substance from the mechanism in the lower parts of the frame.

The plunger casing or receptacle for dough from the hopper 7, is indicated at 8 and is disposed concentrically with an opening 35 in the top 36 of the kneading wheel. The plunger casing 8 is fixed in this position. The casing is divided, by means to be described presently, into a pump chamber 37 in which reciprocates the pump piston 760, and a dough receiving chamber 38 in which reciprocates the plunger 9. Upon downward or retractile movement of the plunger and piston, through the action of a cam A, a considerable suction is created in the large pump chamber 37 which is placed in communication with the chamber 38 at that time, by means about to be described, and into which chamber 38 is sucked a quantity of dough from the hopper 7. The suction, acting upon the dough as it draws the dough into chamber 38, removes from the dough all large air or gas accumulations, and it serves also to practically exhaust the chamber 38 of gas and of its air. Chamber 38 thereby receives a full charge of dough which is of uniform texture, and successive charges accordingly will be of substantially equal weight and/or volume.

Figure 4:
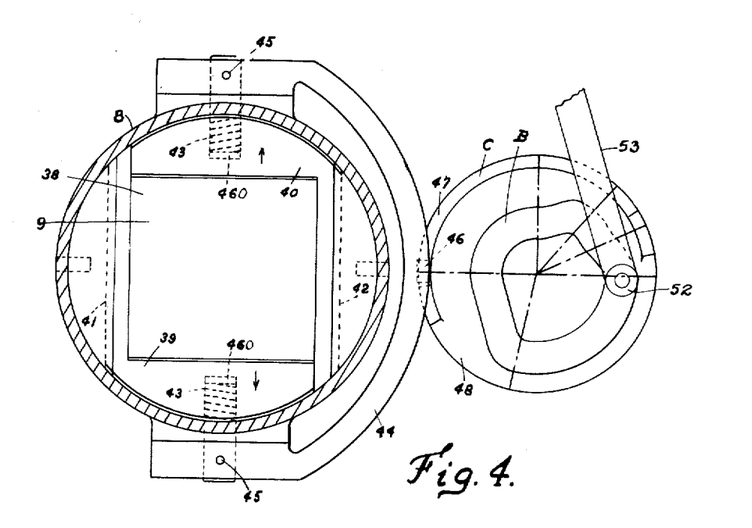
Fig. 4 is a cross-sectional view taken on line 4—4 of Fig. 1.

The means providing for communication between the chambers 37 and 38 are as follows. Within the cylindrical casing 8 are provided a pair of angular wall members 39 and 40, which may be moved relatively in guides 41 and 42 for the purpose of providing a clearance or looseness between said walls and the plunger 9. In other words, said walls, when moved in opposite directions as indicated by the arrows in Fig. 4, provide for a clearance at opposite sides of the plunger, through which clearance space there is provided the desired communication between chambers 37 and 38. Relative movement of the walls is effected by means of a pair of oppositely threaded screw studs 43 which may be rotated by means of a yoke 44 to which the outer ends of the screws are pinned or otherwise secured, as at 45. The threads of the screws engage cooperative threads in bores 460 provided in the walls 39 and 40. From the foregoing it should be apparent that downward movement of the end 46 (Fig. 1) of the yoke will cause the walls to move toward one another, whereas upward movement of the said end will cause the walls to move relatively outwardly, or away from the plunger. The latter condition is shown in Fig. 4, it being apparent that the end or extension 46 of the yoke is resting upon a raised or elevated portion 47 of a cam C, which cam functions to alternately raise and lower the end of the yoke. It is clear from the disclosures in Figs. 1 and 4 that the cam C has an elevated surface 47 and a relatively lower surface 48 upon which the end 46 of the yoke may ride as the kneading wheel is rotated. The cam C is stationary, it being fixed to the post 29 by means of a pin or the like 49.

The member 50, of which cam C is a part, has a second cam in the form of a groove B, which functions to effect swinging movement or acceleration of the hopper relative the chamber 38 during rotation of the hopper and the kneading wheel. The hopper, while rotating with the kneading wheel, is movable to three positions—one in which it registers fully with the chamber 38, a second in which it registers but partly with said chamber, and a third in which it completely exposes said chamber or is out of registry therewith. The third position is shown by broken lines 51 in Fig. 2. The hopper is thus moved by means of the cam B in whose groove rests a roller 52 mounted on one end of an actuating arm 53 the opposite end of which is pivoted upon the kneading wheel at 54. The actuating arm carries a gear sector 55 the teeth of which mesh with a gear, or gear segment, 56, which is fixed on the rotatable stud shaft 57. This shaft is pinned or otherwise fixed to the hopper body, and may rotate in the bearing 58 which is fixed relative the kneading wheel. Certain parts of cam groove B are at various distances from the axis of rotation of the kneading wheel, (Figs. 1 and 4), wherefore it follows that the hopper actuating means 53 will be moved about its pivot 54, upon rotation of the kneading wheel, for actuating the gear elements 55 and 56 which results in movement of the hopper successively to the three positions above mentioned. In its movement across the opening or chamber 38, the annular lower edge 59 of the hopper wall acts as a knife for cutting off or separating the dough in chamber 38 from that in the hopper. Obviously, then, upon movement of the hopper to the extreme position indicated at 51 of Fig. 2, the dough in chamber 38 may be cut off flush with the top of the kneading wheel. This operation, however, occurs subsequent to the extruding operation wherein the hopper is moved to the second or intermediate position wherein it communicates only slightly with the chamber 38, during which interval the plunger 9 is moved upwardly a predetermined distance to eject back into the hopper, through the constricted opening thereby provided, a portion of the dough of the chamber 38. Upon termination of this extruding operation, the dough is found to completely fill the chamber 38 above the plunger, and is considered measured and ready for ejection from the chamber. It is to be noted that during the extruding operation the chamber 38, except for the restricted passage between it and the hopper, is covered by an apron 60 (Fig. 2) which is secured to and is movable with the hopper. This apron slides upon the top of the kneading wheel when the hopper is moved, and serves to keep the major portion of the dough in the chamber 38 during the extruding operation. After the extruding operation is completed, the hopper moves to the third or inoperative position, (51, Fig. 2), whereupon the plunger 9 is actuated to raise the measured mass in chamber 38 to the level of the top of the kneading wheel. While the hopper 7 is thus disposed in this offset position, the mass is pushed into the receiving port 12 of the baller, by any suitable means such as arm 61, wherein it is worked into kneaded lumps.

The means for pushing the measured mass into the receiving port 12 may be of any suitable construction. Means for the purpose may be an arm 61 held in a normally inoperative position beneath the inclined bottom wall of the hopper 7, by a spring 62. The arm has an extension 63 adapted to strike a stationary abutment or lug 64 near the port 12, whereby the arm may be moved about its pivot 65, as the kneading wheel rotates, for contacting and directing the measured mass into the port 12. Pivot 65 is fixed upon the kneading wheel. An extending stop 66 determines the inoperative position of the arm. A stationary or adjustable bracket 67 may support the abutment or actuator 64.

Figure 1:
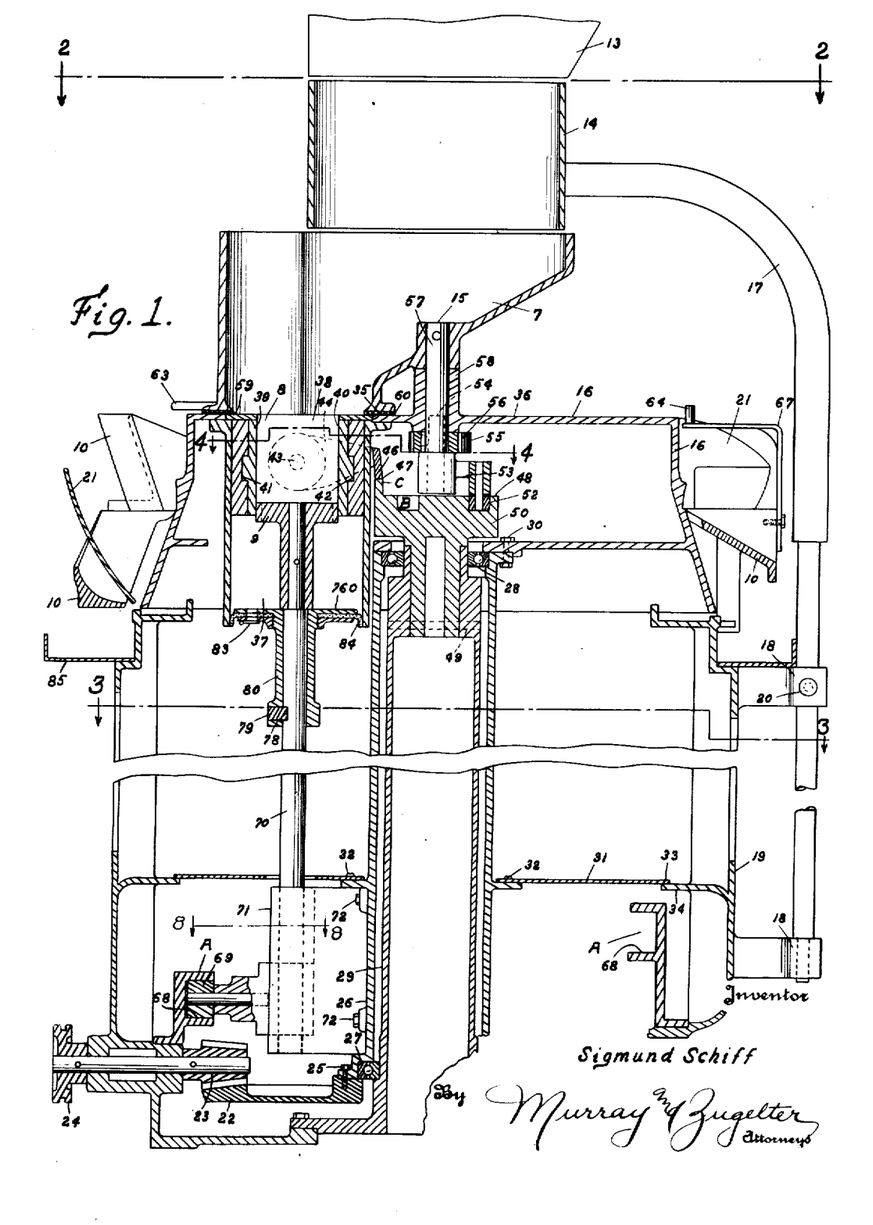
Fig. 1 is a vertical cross-sectional view of the combination divider and baller of the invention.
Figure 2:
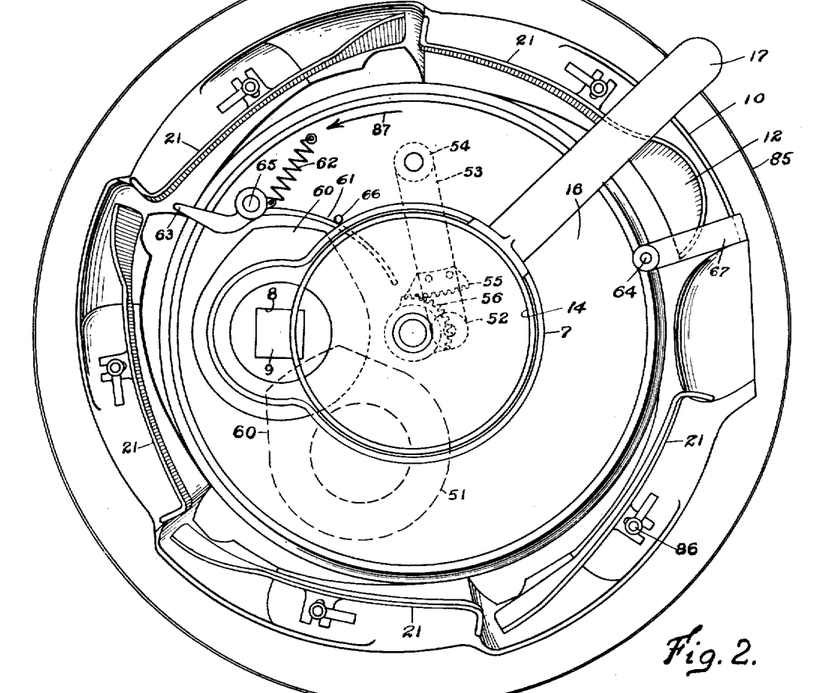
Fig. 2 is a plan view taken on line 2—2 of Fig. 1.
Figure 3:
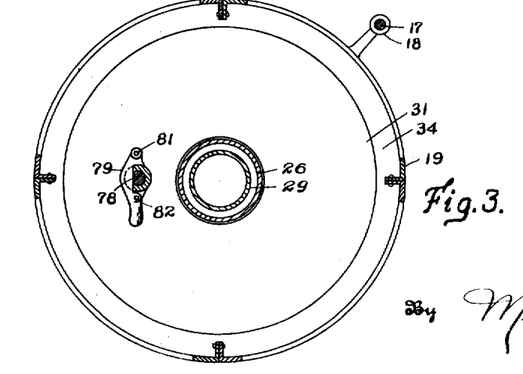
Fig. 3 is a cross-sectional view, on a reduced scale, taken on line 3—3 of Fig. 1.
Figure 6:
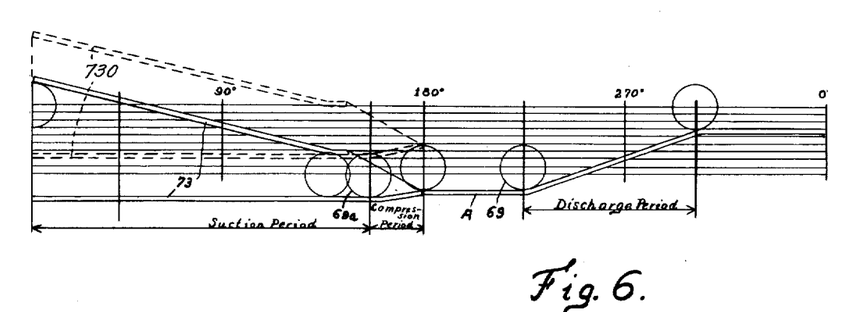
Fig. 6 is a view of a diagram indicating the operations of a cam A, and showing a development of said cam.

The means for actuating the plunger 9 and pump piston 760 comprises the cam A, a development of which is shown in Fig. 6. The cam has a face 68 upon which rides a roller 69 mounted upon the connecting rod 70 to which rod the plunger and pump piston are secured. A bracket 71, which may be secured to the rotating sleeve 26 as at 72, provides a bearing in which the rod may reciprocate while moving with the sleeve and kneading wheel. As shown in Fig. 1, the roller 69 is located on that portion of the cam indicated at "69a" of Fig. 6. In other words, the plunger is down, at the end of the suction period, and is ready to begin the short compression stroke which initiates the extruding operation. In the diagram of Fig. 6, the series of parallel lines indicates by half inches the vertical travel of the cam roller 69. By reference to the diagram, it is clear that during the extrusion operation the cam A elevates the roller about one half inch (indicated by "compression period"); thereafter the roller remains at the said elevation until the beginning of the "discharge period", during which period it rises about four inches. These elevations of course are arbitrary and the cam A may be designed to give any desired amount of vertical travel to the cam roller.

Figure 7:
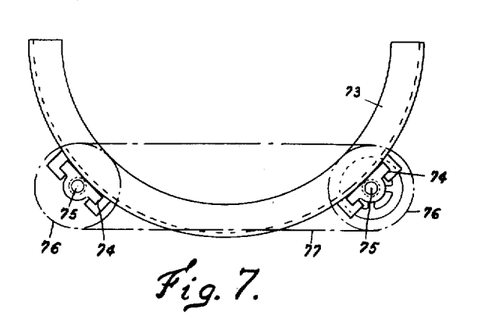
Fig. 7 is a top view of a cam section showing how the cam A may be made adjustable for the production of various weights or sizes of divided plastic masses.
Figure 8:
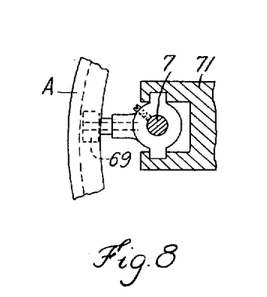
Fig. 8 is a cross-sectional view taken on the line 8—8 of Fig. 1.

In Fig. 7 is shown a means for making the cam A adjustable whereby to vary the volume of dough delivered by the chamber 38. The left hand half 73 of cam A may be separate from the right hand half and mounted, as in Fig. 7, upon a pair of vertical guide or slide means 74. By means of a pair of screws 75, rotated in unison by means of the sprockets and chain 76 and 77, the cam section 73 may be elevated or lowered, as illustrated diagrammatically by the broken lines 730 of Fig. 6, for varying the extent of vertical movement of the plunger rod 70. Any other suitable means may be employed for this purpose.

In order to provide for cleaning out the pump chamber 37, the pump piston is arranged to be moved longitudinally of the rod 70 by the removal, from a notch 78 in rod 70, of a stop or latch 79. The latch may be pivoted on the pump piston body 80, as at 81, and held in the operative or latched position by a removable pin 82. Other means for the purpose will readily suggest themselves, and the invention therefore is not to be restricted to the specific latch means shown.

The pump piston may be provided with a flapper type, or other type of valve 83, to assist in relieving pressure in the pump chamber when the piston is advanced. The flexible gland 84 of the piston may be of leather or other suitable material, and is arranged so that it will provide a seal, when the piston is retracted, for creating a vacuum in the pump chamber 37. At 85 is represented an annular pan for receiving particles of dough or flour liberated during the balling operation. The kneading plates 21 are adjustable by means of the securing members 86. The direction of rotation of the kneading wheel is indicated by the arrow 87.

Figure 5:
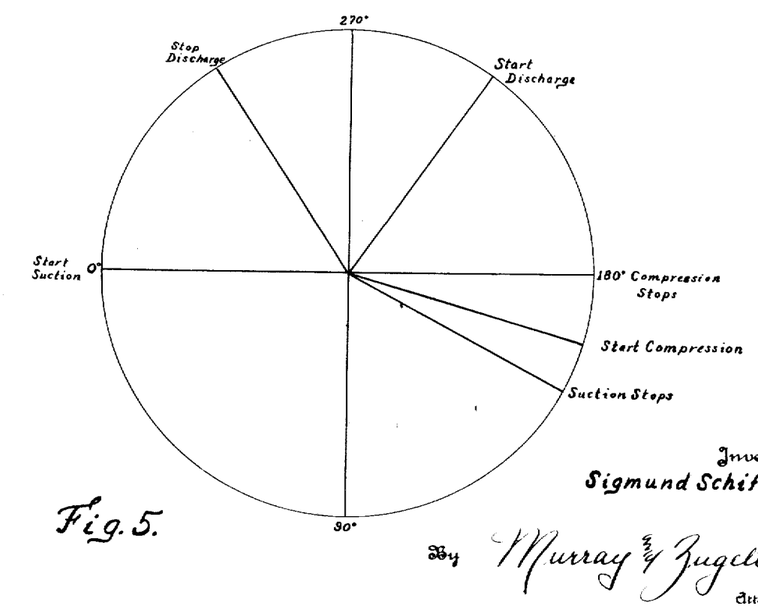
Fig. 5 is a diagram indicating the cycle of operations of the device and the approximate duration of each operation.

The operation of the device is as follows. It is to be assumed that the machine is to be started from the position shown in Fig. 1, wherein the plunger 9 is in retracted position, the chamber 38 being filled with plastic material and the hopper 7 being in full registration with the chamber opening. Also, the yoke or lever 44 is raised and resting upon the elevated portion 47 of cam C, under which condition the walls 39 and 40 are expanded or spread apart. On the diagram or chart of Fig. 5, the above condition is represented at the location "suction stops". The chart is to be read in counter-clockwise direction.

As the kneading wheel rotates with the hopper 7, the end or follower 46 of lever 44 leaves the elevated portion 47 of cam C and assumes a position on the lowered portion 48, thereby contracting the walls 39 and 40 about the plunger. The kneading wheel, after a short period of time sufficient to insure a substantially complete filling of chamber 38, moves to the position "start compression", wherein the plunger 9 is to move upwardly, by the action of cam A, about one-half inch. Just before this upward movement of the plunger, the cam B causes the hopper to be accelerated or moved to a position wherein the apron 60 thereof covers all but a small portion of the top of chamber 38, whereupon, as the plunger moves slightly upwardly, the extruding of plastic through the constricted opening thereby formed, takes place. This operation slightly compresses the plastic in chamber 38 and insures its complete filling with plastic material. The kneading wheel is now at the position "compression stops". Between this position and the position "start discharge", the hopper is moved by the cam B to the inoperative position indicated at 51 of Fig. 2, thereby cutting off and exposing the measured plastic mass in the chamber 38. Next, from the position "start discharge" to the position "stop discharge", the cam A effects a second upward or extended movement of plunger 9, which disposes the plunger top on a level with the top of the kneading wheel, with the measured plastic mass resting on the plunger top. At about this time, the arm 61 is actuated, by the abutment 64, to remove the mass of dough from the kneading wheel and deposit it in the baller at 12. It is to be noted that any gases in pump chamber 37 are expelled through the valve 83, or about the periphery of pump washer 84.

Upon termination of the above operations, the cam B operates to decelerate or move the hopper back into complete registration with chamber 38, and cam C acts to elevate the follower of lever 44 thereby extending or expanding the chamber walls 39 and 40. Upon reaching the position "start suction", the cam A begins to retract the plunger 9 and the pump piston 760, thereby creating a vacuum in both the pump chamber and the dough chamber 38, by reason of the communication afforded therebetween by the extension or expansion of the walls 39 and 40. Plastic material from the hopper thereupon is sucked into chamber 38 and any large gas or air pockets in said material are broken by the suction, and the gas or air therefrom is sucked into the pump chamber 37. This operation is followed by a short pause in the operations, to allow the plastic material to substantially fill the chamber 38, whereupon the cycle of operations is repeated.

It is to be understood that for dividing some substances the suction pump may be dispensed with. Various other modifications and changes in structural details of the device may be made, within the scope of the claims, without departing from the spirit of the invention.

What is claimed is:

1. In a device of the class described the combination of a hopper, a revolving plunger casing, a plunger within the casing, means for effecting relative movement of the hopper and the plunger casing whereby to move the plunger casing into and from registration with the hopper, means to actuate the plunger for creating a chamber in the plunger casing for receiving a plastic from the hopper and for moving the plunger toward the hopper while the chamber is in communication with the hopper whereby to move a portion only of the plastic from the chamber into the hopper.

2. In a device of the class described the combination of a hopper, a revolving plunger casing, a plunger within the casing, means for effecting relative movement of the hopper and the plunger casing whereby to move the plunger casing into and from registration with the hopper, means to actuate the plunger for creating a chamber in the plunger casing for receiving a plastic from the hopper and for moving the plunger toward the hopper while the chamber is in communication with the hopper, and means for reducing the pressure intermediate the plunger and the plastic within the chamber whereby to permit complete filling of the chamber with plastic.

3. In a device of the class described the combination of a hopper, a revolving plunger casing, a plunger reciprocally contained in the casing, and means for effecting relative movement of the hopper and the plunger casing whereby to bring the plunger into and from registration with the hopper, for moving the plunger away from the hopper when in registration therewith whereby a plastic contained in the hopper is caused to enter the space vacated by the plunger, for effecting relative movement of the hopper and the plunger casing whereby to reduce the passage between the hopper and the space created in the casing by the movement of the plunger, for moving the plunger toward the plastic in the last referred to space whereby to return some of the plastic to the hopper and for effecting further relative movement of the hopper and plunger casing whereby to sever communication between the space in the plunger casing and the hopper.

4. In a device of the class described the combination of a hopper, a revolving plunger casing, a plunger reciprocally contained in the casing, and means for effecting relative movement of the hopper and the plunger casing whereby to bring the plunger into and from registration with the hopper, for moving the plunger away from the hopper when in registration therewith whereby a plastic contained in the hopper is caused to enter the space vacated by the plunger, for effecting relative movement of the hopper and plunger casing whereby to reduce the passage between the hopper and the space created in the plunger casing by the movement of the plunger, for moving the plunger toward the plastic in the last referred to space whereby to return some of the plastic to the hopper and for effecting further relative movement of the hopper and plunger casing whereby to sever communication between the space in the casing and the hopper, and means for reducing the pressure within the space in the casing intermediate the plunger and the plastic whereby the plastic will completely fill the space in the plunger casing before the plunger will return any of the plastic to the hopper.

5. In a device of the class described the combination of a hopper, a revolving plunger casing, a plunger reciprocally contained in the casing, and means for effecting relative movement of the hopper and the casing whereby to bring the plunger into and from registration with the hopper, for moving the plunger away from the hopper when in registration therewith whereby a plastic contained in the hopper is caused to enter the space vacated by the plunger, for effecting relative movement of the hopper and the plunger casing whereby to reduce the passage between the hopper and the space created in the plunger casing by the movement of the plunger, for moving the plunger toward the plastic in the last referred to space whereby to return some of the plastic to the hopper, for effecting further relative movement of the hopper and plunger casing whereby to sever communication between the space in the plunger casing and the hopper, and for actuating the plunger whereby to discharge the plastic from the casing.

6. In a device of the class described the combination of a hopper, a revolving plunger casing, a plunger reciprocally contained in the casing, and means for effecting relative movement of the hopper and the casing whereby to bring the plunger into and from registration with the hopper, for moving the plunger away from the hopper when in registration therewith whereby a plastic contained in the hopper is caused to enter the space vacated by the plunger, for effecting relative movement of the hopper and the plunger casing whereby to reduce the passage between the hopper and the space created in the plunger casing by the movement of the plunger, for moving the plunger toward the plastic in the last referred to space whereby to return some of the plastic to the hopper, for effecting further relative movement of the hopper and plunger casing whereby to sever communication between the space in the plunger casing and the hopper, and for actuating the plunger whereby to discharge the plastic from the casing, and means for reducing the pressure within the space in the plunger casing intermediate the plunger and the plastic whereby the plastic will completely fill the space in the casing before the plunger will return any of the plastic to the hopper.

7. In a device of the class described the combination of a revolving plunger casing, a hopper movable relative to said casing, a plunger reciprocally carried by said casing and adapted to be placed in and out of registration with the hopper through the relative movement of the hopper and plunger casing, means for actuating the plunger whereby to draw into the plunger casing a quantity of plastic, means for developing relative step by step movement between the hopper and the plunger casing, whereby the hopper and plunger casing are temporarily quiescent and the plunger will register in part only with the hopper, and means for creating a vacuum intermediate the plunger and a plastic that has entered into the plunger casing, the plunger actuating means being adapted to move the plunger toward the plastic during partial registration of the plunger with the hopper whereby the plastic is caused to completely fill the space between the plunger and the hopper and whereby some of the plastic is returned from the plunger casing to the hopper.

8. In a device of the class described the combination of a support, a revolving plunger casing carried by the support, a plunger reciprocally contained within the plunger chamber adapted to assume a position with its one face flush with the face of the support, a hopper supported above the plunger and movable over the referred to face of the support and the plunger whereby the face of the plunger may register with the interior of the hopper and may assume a position exteriorly to the hopper, means for actuating the hopper for imparting a step by step movement thereto whereby the plunger may assume a position in partial registration with the hopper, and means for moving the plunger away from the hopper when the hopper extends about the plunger face whereby to draw a plastic into the plunger casing, for moving the plunger toward the hopper when the plunger registers in part only with the hopper whereby to expel a portion of the plastic from the plunger casing, and for moving the plunger to bring its referred to face flush with the referred to face of the plunger casing when the plunger is disposed completely without the hopper.

9. In a device of the class described the combination of a support, a revolving plunger casing carried by the support, a plunger reciprocally contained within the plunger chamber adapted to assume a position with its one face flush with the face of the support, a hopper supported above the plunger and movable over the referred to face of the support and the plunger whereby the face of the plunger may register with the interior of the hopper and may assume a position exteriorly to the hopper, means for actuating the hopper for imparting a step by step movement thereto whereby the plunger may assume a position in partial registration with the hopper, and means for moving the plunger away from the hopper when the hopper extends about the plunger face whereby to draw a plastic into the plunger casing, for moving the plunger toward the hopper whereby to expel a portion of the plastic from the plunger casing, and for moving the plunger to bring its referred to face flush with the referred to face of the plunger casing when the plunger is disposed completely without the hopper, and means for creating a vacuum intermediate the plunger and the plastic contained in the plunger casing when the plunger is in partial communication with the hopper.

10. In a device of the class described the combination of a hopper and a revolving measuring receptacle arranged for relative movement and for communication whereby a plastic within the hopper may move into the receptacle, a plunger within the receptacle, means for moving the plunger in the receptacle for sucking plastic into the receptacle, means for relatively moving the receptacle and hopper for partially severing the plastic within the hopper from the plastic within the receptacle and for reducing the path of communication between the receptacle and the hopper, means for actuating the plunger for exerting pressure upon the plastic within the receptacle and for ejecting some of the plastic from the receptacle, means for effecting relative movement of the hopper and the receptacle for completely severing the plastic within the receptacle from the plastic within the hopper, and means for actuating the plunger for ejecting the plastic from the receptacle.

11. In a device of the class described the combination of a hopper and a revolving measuring receptacle arranged for relative movement and for communication whereby a plastic within the hopper may move into the receptacle, a plunger within the receptacle, means for moving the plunger in the receptacle for sucking plastic into the receptacle, means for relatively moving the receptacle and hopper for partially severing the plastic within the hopper from the plastic within the receptacle and for reducing the path of communication between the receptacle and the hopper, means for withdrawing gases from the portion of the receptacle containing the plastic, means for actuating the plunger for exerting pressure upon the plastic within the receptacle and for ejecting some of the plastic from the receptacle, means for effecting relative movement of the hopper and the receptacle for completely severing the plastic within the receptacle from the plastic within the hopper, and means for actuating the plunger for ejecting the plastic from the receptacle.

12. In a device of the class described the combination of a hopper adapted to receive a plastic, a revolving measuring receptacle for receiving plastic from the hopper, a plunger reciprocally mounted in the measuring receptacle, means for effecting relative movement of the hopper and the measuring receptacle whereby to bring said receptacle out of communication with the hopper, means for reciprocating the plunger and means for creating a vacuum in the measuring receptacle intermediate the plunger and the hopper.

13. In combination a hopper means for receiving gas-containing dough, a revolving plunger casing adapted to have its interior in communication with the hopper for receiving dough therefrom, a plunger in the said casing for drawing dough from the hopper into the plunger casing, the plunger casing and the interior of said casing being so related to the opening in the hopper as to provide for a seal therebetween consisting wholly of the dough, means for extracting gases from the interior of the plunger casing after dough has been drawn therein whereby to without mechanical pressure uniformly fill the interior of said casing with dough of uniform density, means to sever the body of dough within the plunger casing from the body of dough in the hopper, and means to effect limited extrusion of dough from the interior of the plunger casing intermediate the beginning and end of the severing action.

14. In a device of the class described the combination of a hopper and a revolving measuring receptacle arranged for relative movement and for communication whereby a plastic within the hopper may move into the receptacle, a plunger within the receptacle, means for moving the plunger in the receptacle and for introducing plastic into the receptacle, means for relatively moving the receptacle and hopper for partially severing the plastic within the hopper from the plastic within the receptacle and for reducing the path of communication between the receptacle and the hopper, means for actuating the plunger for exerting pressure upon the plastic within the receptacle and for ejecting some of the plastic from the receptacle, means for effecting relative movement of the hopper and receptacle for completely severing the plastic within the receptacle from the plastic within the hopper, and means for actuating the plunger for ejecting the plastic from the receptacle.

15. In a device of the class described the combination of a hopper and a revolving measuring receptacle arranged for relative movement and for communication whereby a plastic within the hopper may move into the receptacle, a plunger within the receptacle, means for moving the plunger in the receptacle and for introducing plastic into the receptacle, means for relatively moving the receptacle and hopper for partially severing the plastic within the hopper from the plastic within the receptacle and for reducing the path of communication between the receptacle and the hopper, means for withdrawing gases from that portion of the receptacle containing the plastic, means for actuating the plunger for exerting pressure upon the plastic within the receptacle and for ejecting some of the plastic from the receptacle, means for effecting relative movement of the hopper and receptacle for completely severing the plastic within the receptacle from the plastic within the hopper, and means for actuating the plunger for ejecting the plastic from the receptacle.

16. The combination of a hopper, a revolving measuring receptacle, means for supporting the hopper and measuring receptacle in proximity to each other and for movement relative one another whereby the measuring receptacle may be placed in communication with and placed out of communication with the hopper, means for introducing substance to be measured into the measuring receptacle from the hopper, means for reducing pressure within the measuring receptacle after the substance has entered said receptacle, and means for effecting relative movement of the receptacle and hopper, for partly exhausting the measuring chamber into the hopper, for severing the substance within said receptacle from the substance in the hopper, and for completely exhausting the measuring chamber elsewhere than into the hopper.

17. The combination of a hopper and a revolving measuring receptacle having movement relative one another and adapted for communication with one another, means for effecting relative movement of the hopper and receptacle for alternately bringing the measuring receptacle and hopper into and out of communication with one another, for introducing substance into the receptacle from the hopper when they are in communication, for partially exhausting the receptacle into the hopper, for severing the substance remaining in the receptacle from the substance in the hopper and for exhausting the receptacle after the hopper and receptacle are out of communication with one another.

18. The combination of a hopper and a revolving measuring receptacle having movement relative one another and adapted for communication with one another, means for effecting relative movement of the hopper and receptacle for alternately bringing the measuring receptacle and hopper into and out of communication with one another, for introducing substance into the receptacle from the hopper when they are in communication, for reducing the communication between the hopper and receptacle and partly severing the substance in the receptacle from the substance in the hopper, for partially exhausting the receptacle into the hopper, for severing the substance remaining in the receptacle from the substance in the hopper and for exhausting the receptacle after the hopper and receptacle are out of communication with one another.

19. The combination of a hopper and a revolving measuring receptacle having movement relative one another and adapted for communication with one another, means for effecting relative movement of the hopper and receptacle for alternately bringing the measuring receptacle and hopper into and out of communication with one another, for introducing substance into the receptacle from the hopper when they are in communication, for partially exhausting the receptacle into the hopper, for severing the substance remaining in the receptacle from the substance in the hopper and completely enclosing the severed mass, and for exhausting the receptacle after the hopper and receptacle are out of communication with one another.

20. The combination with a hopper and a revolving measuring receptacle adapted for communication with one another whereby divisible substance may pass between them, of means for introducing divisible substance into the receptacle from the hopper, for partially exhausting the receptacle into the hopper, for severing the substance remaining in the receptacle from the substance in the hopper, for bringing the hopper and receptacle out of communication and completely enclosing the substance within the measuring receptacle until after the substance is wholly detached from the substance in the hopper and for then discharging the measuring receptacle.

21. In a device of the class described the combination of a hopper, a rotating kneading wheel moving adjacent to the hopper and toward which the hopper discharges its contents, a kneading ring surrounding said wheel, a plunger casing supported by said wheel, a plunger reciprocally contained in the casing, and means for effecting relative movement of the hopper and the plunger casing of the kneading wheel whereby to bring the plunger into and from registration with the hopper, for moving the plunger away from the hopper when in registration therewith whereby a plastic contained in the hopper is caused to enter the space vacated by the plunger, for effecting relative movement of the hopper and the plunger casing whereby to reduce the passage between the hopper and the space created in the casing by the movement of the plunger, for moving the plunger toward the plastic in the last referred to space whereby to return some of the plastic to the hopper, for effecting further relative movement of the hopper and plunger casing whereby to sever communication between the space in the plunger casing and the hopper, for further moving the plunger to eject the plastic mass from the plunger casing, and means for directing the ejected mass onto the kneading ring.

22. In a combined divider and baller, the combination of a hopper for plastic material, a rotating kneading wheel disposed adjacent the hopper and toward which the hopper discharges its contents, cooperative kneading means disposed adjacent the kneading wheel, a plunger casing supported by the kneading wheel, a plunger for reciprocation in the said casing, means for effecting relative movement of the hopper and the plunger casing of the kneading wheel whereby to bring the hopper out of communication with the plunger casing, means for moving the plunger to provide a chamber in the plunger casing for reception of plastic material from the hopper and for subsequently moving the plunger to eject said plastic material to a position above the kneading wheel, and means for directing said ejected plastic mass toward the cooperative kneading means.

23. In a combined divider and baller, the combination of a rotating kneading wheel, cooperative kneading means disposed adjacent the kneading wheel, a plunger casing supported by the kneading wheel eccentric with the axis of rotation of the kneading wheel, a hopper for plastic material disposed concentrically with the kneading wheel and normally extending over the plunger casing, means for moving the hopper relative to the kneading wheel to an inoperative position out of registration with said plunger casing, a plunger for reciprocation in the plunger casing, means for moving the plunger to provide a chamber in the plunger casing for reception of plastic material from the hopper and for subsequently moving the plunger to eject said plastic material to a position above the kneading wheel when the hopper is in the inoperative position, and means for directing said ejected plastic masses toward the cooperative kneading means.

24. In a combined divider and baller, the combination of a rotating kneading wheel, cooperative kneading means disposed adjacent the kneading wheel, a plunger casing supported by the kneading wheel eccentric with the axis of rotation of the kneading wheel, a hopper for plastic material disposed concentrically with the kneading wheel and normally extending over the plunger casing, means for moving the hopper relative to the kneading wheel to an inoperative position out of registration with said plunger casing, a plunger for reciprocation in the plunger casing, means for moving the plunger to provide a chamber in the plunger casing for reception of plastic material from the hopper and for subsequently moving the plunger to eject said plastic material to a position above the kneading wheel when the hopper is in the inoperative position, means for directing said ejected plastic mass toward the cooperative kneading means, and means for creating a vacuum in the above mentioned chamber whereby to draw the plastic material from the hopper.

25. In a device of the class described the combination of a plunger casing and means supporting same, a hopper for plastic material supported adjacent the plunger casing, a plunger reciprocable in the plunger casing and serving to divide the said casing into a plastic receiving chamber and a pump chamber, the plunger being operative in the plastic receiving chamber, a pump piston in the pump chamber arranged to create a vacuum therein, and means comprising movable walls for effecting communication at a predetermined time between the chambers.

26. In a device of the class described the combination of a plunger casing and means supporting same, a hopper for plastic material supported adjacent the plunger casing, a plunger reciprocable in the plunger casing and serving to divide the said casing into a plastic receiving chamber and a pump chamber, the plunger being operative in the plastic receiving chamber, a pump piston in the pump chamber arranged to create a vacuum therein, means for moving a portion of the chamber wall abutting the plunger to provide an abnormal space between the wall and the plunger for the purpose of effecting communication between the chambers, and means for actuating the wall moving means at predetermined intervals.

27. In a device of the class described the combination of a plunger casing and means supporting same, a hopper for plastic material supported adjacent the plunger casing, a plunger reciprocable in the plunger casing and serving to divide the said casing into a plastic receiving chamber and a pump chamber, the plunger being operative in the plastic receiving chamber, a pump piston in the pump chamber arranged to create a vacuum therein, a common connecting means for the plunger and the pump piston and means for actuating said connecting means, and means comprising movable walls for effecting communication at a predetermined time between the chambers.

28. In combination a rotating kneading wheel having a top surface and a kneading surface, the top surface having an opening therein eccentric to the axis of rotation of the kneading wheel, a hopper mounted for limited movement about a pivot in axial alignment with said axis of rotation, said hopper being concentric with the axis of rotation of said kneading wheel, an extended portion on the hopper adapted to register with the opening of the kneading wheel, and means for moving the hopper about its pivot to and from registering position relative the opening.

29. In combination a rotating kneading wheel having a top surface and a kneading surface, the top surface having an opening therein eccentric to the axis of rotation of the kneading wheel, a hopper mounted for limited movement about a pivot in axial alignment with said axis of rotation, said hopper being concentric with the axis of rotation of said kneading wheel, an extended portion on the hopper adapted to register with the opening of the kneading wheel, means for moving the hopper about its pivot to and from registering position relative the opening, and a member adapted to swing across and above said opening upon each movement of the hopper to non-registering position.

30. In combination a rotating kneading wheel having a top surface and a kneading surface, the top surface having an opening therein eccentric to the axis of rotation of the kneading wheel, a hopper mounted for limited movement about a pivot in axial alignment with said axis of rotation, said hopper being concentric with the axis of rotation of said kneading wheel, an extended portion on the hopper adapted to register with the opening of the kneading wheel, means for moving the hopper about its pivot to and from registering position relative the opening, a member adapted to swing across and above said opening upon each movement of the hopper to non-registering position, and cooperating kneading means disposed about the kneading surface of the kneading wheel.

31. The combination with a dough kneading device comprising a pair of relatively moving members having pockets and cooperating kneading surfaces formed between them, of a divider operatively supported by one of said members of the kneading device and discharging into one of the pockets of the kneading device.

32. The combination with a dough kneading device comprising a pair of members, one of which members has rotation about a vertical axis, relative the other member, the members having pockets and cooperating kneading surfaces formed between them and along which surfaces and pockets lumps of dough are moved in a substantially horizontal plane by the relative movement of the members, of a divider operatively supported by one of said pair of members of the kneading device and discharging between the kneading members.

33. The combination with a dough kneading device comprising a stationary member and a relatively movable member having pockets and cooperating kneading surfaces formed between them, of a divider operatively supported by the moving member of the kneading device and arranged to discharge into one of the pockets of the kneading device.

34. The combination with a dough kneading device comprising a pair of members, one of which members is stationary and the other of which is rotatable about a vertical axis relative to the stationary member, the members having pockets and cooperating kneading surfaces formed between them and along which surfaces and pockets lumps of plastic are moved in a substantially horizontal plane by the relative movement of the members, of a divider operatively supported by the rotatable member of the kneading device and arranged to discharge the lumps of plastic into one of the pockets located between the kneading members.

In testimony whereof, I have hereunto subscribed my name this 13th day of October, 1931.

SIGMUND SCHIFF.

CERTIFICATE OF CORRECTION.

Patent No. 1,893,845.　　　　　　　　　　　　　　　　　　　　January 10, 1933.

SIGMUND SCHIFF.

It is hereby certified that error appears in the printed specification of the above numbered patent requiring correction as follows: Page 7, lines 62 and 63, claim 14, strike out the words "for actuating the plunger"; and that the said Letters Patent should be read with this correction therein that the same may conform to the record of the case in the Patent Office.

Signed and sealed this 28th day of March, A. D. 1933.

(Seal)　　　　　　　　　　　　　　　　　　　　　　　　　Acting Commissioner of Patents.

and discharging between the kneading members.

33. The combination with a dough kneading device comprising a stationary member and a relatively movable member having pockets and cooperating kneading surfaces formed between them, of a divider operatively supported by the moving member of the kneading device and arranged to discharge into one of the pockets of the kneading device.

34. The combination with a dough kneading device comprising a pair of members, one of which members is stationary and the other of which is rotatable about a vertical axis relative to the stationary member, the members having pockets and cooperating kneading surfaces formed between them and along which surfaces and pockets lumps of plastic are moved in a substantially horizontal plane by the relative movement of the members, of a divider operatively supported by the rotatable member of the kneading device and arranged to discharge the lumps of plastic into one of the pockets located between the kneading members.

In testimony whereof, I have hereunto subscribed my name this 13th day of October, 1931.

SIGMUND SCHIFF.

CERTIFICATE OF CORRECTION.

Patent No. 1,893,845.　　　　　　　　　　　　　　　　　　　January 10, 1933.

SIGMUND SCHIFF.

It is hereby certified that error appears in the printed specification of the above numbered patent requiring correction as follows: Page 7, lines 62 and 63, claim 14, strike out the words "for actuating the plunger"; and that the said Letters Patent should be read with this correction therein that the same may conform to the record of the case in the Patent Office.

Signed and sealed this 28th day of March, A. D. 1933.

(Seal)　　　　　　　　　　　　　　　　　　　　　　　　Acting Commissioner of Patents.

CERTIFICATE OF CORRECTION.

Patent No. 1,893,845. January 10, 1933.

SIGMUND SCHIFF.

It is hereby certified that error appears in the printed specification of the above numbered patent requiring correction as follows: Page 7, lines 62 and 63, claim 14, strike out the words "for actuating the plunger"; and that the said Letters Patent should be read with this correction therein that the same may conform to the record of the case in the Patent Office.

Signed and sealed this 28th day of March, A. D. 1933.

(Seal) Acting Commissioner of Patents.